United States Patent

Michel

[15] 3,699,946
[45] Oct. 24, 1972

[54] WAVEFORM ABNORMALITY MONITOR

[72] Inventor: Walter A. Michel, 9035 North Mango Avenue, Morton Grove, Ill. 60053

[22] Filed: Aug. 11, 1970

[21] Appl. No.: 62,831

[52] U.S. Cl. .................................128/2.06 A
[51] Int. Cl. ........................................A61b 5/04
[58] Field of Search........128/2.06 A, 2.06 F, 2.06 R, 128/2.05 P, 2.05 R, 2.05 S, 2.05 T

[56] References Cited

UNITED STATES PATENTS

| 3,267,934 | 8/1966 | Thornton | 128/2.06 A |
| 3,460,527 | 8/1969 | Karsh | 128/2.06 A |
| 3,438,368 | 4/1969 | Karsh | 128/2.06 A |
| 3,144,019 | 8/1964 | Haber | 128/2.06 A |
| 3,533,402 | 10/1970 | Siedband | 128/2.06 A |
| 3,132,208 | 5/1964 | Dymski et al. | 128/2.05 S |

*Primary Examiner*—William E. Kamm
*Attorney*—John E. Peele, Jr.

[57] ABSTRACT

A portable, programmable electronic device for monitoring the heartbeat waveform of an ambulatory individual by sensing the difference between potentials from a pair of sensors attached to the individual, and electronically processing the waveform to detect and warn of the presence in that waveform of abnormalities, such as extrasystoles, which indicate the imminence of a possible heart attack. The potential difference, represented as a waveform formed by a series of R-wave complexes and any intermediate waveforms, is passed into a time controlled gate which is open during only the monitoring period following an R-wave complex so that an intermediate extrasystole will actuate an indicator.

8 Claims, 10 Drawing Figures

WALTER A. MICHEL

WAVEFORM ABNORMALITY MONITOR

The invention relates to a compact programmable electronic device for recognizing some of the signs of a potential heart attack. Particularly, the device relates to an electronic device for sensing electrical signals generated by the human body at selected points of the body, which signals are related to the rate and constancy of the heart beat. The device further enables detecting variations from normal patterns of the heart beat. When a pattern variation or abnormality occurs, the device, by an indicator, functions to warn the user of the possibility of a heart attack. With the warning, the user can take precautions as necessary including medical consultation.

The risk of a heart attack is known to be greater in individuals who have suffered an earlier heart attack as compared to those who have not had a previous attack. For those individuals who must be most concerned, a device to monitor the heart beat waveform yet to permit continuing their regular activities is desirable. Although the term "heart attack" describes many varieties of heart disease which might result in heart failure, particular interest is directed toward the class in which extrasystoles may lead to ventricular fibrillation. With adequate warning to enable obtaining medical consultation and treatment, many of the complications due to ventricular fibrillation can be prevented.

Although heart disease, such as ventricular fibrillation, develops suddenly in its dangerous form, it is generally preceeded by other abnormalities in the pattern of the heart beat, which abnormalities, if recognized, can be used to warn the individual in due time. Abnormalities of the heart beat usually begin several hours before the actual heart attack. Hence, if the individual is warned, preventative medical treatment is possible.

Various types of electrocardiographic machines are known and are available at medical institutions for those individuals who can and will go to the institution. However, the necessity for expert personnel to operate these machines and to analyze the results makes the use of these machines relatively expensive and available only at fixed locations. Other machines and devices approaching portability have been suggested in the prior art, but these have not provided complete and reliable portable electronic package usable by the "ambulatory individual" who would desire to be warned, yet also desire minimum disruptions in daily life due to periodic "hooking up" to an electronic package or frequent medical consultation for analysis of the readings from the package.

The cardiac monitor of the present invention senses first a constant in the form of the patient's cardiac R-wave complex which is generally of normal duration although the frequency thereof may vary due to ordinary causes. Using the QR rise of an R-wave complex as a starting point, the monitor examines the period between the initiating wave and a next wave for the imminence of ventricular fibrillation which is evidenced by extrasystoles. These extrasystoles, caused by irritations of the heart, produce electrical pulsations longer or broader than the R-wave. Although extrasystoles occur irregularly between R-waves, the pattern of occurrences toward a dangerous condition can be recognized. That is, over an extended period of time, each succeeding extrasystole occurs closer in time to the R-wave it follows. Thus, a selected "time window" following an R-wave can be looked at to cause a positive indication that the dangerous class of extrasystoles are occurring.

It is an object of the present invention to provide a heart beat waveform abnormality monitor having the aforegoing characteristics.

The above and other objects of the invention will be apparent from the following detailed description, considered in connection with the accompanying drawings in which like numerals refer to like parts.

Figure 1:
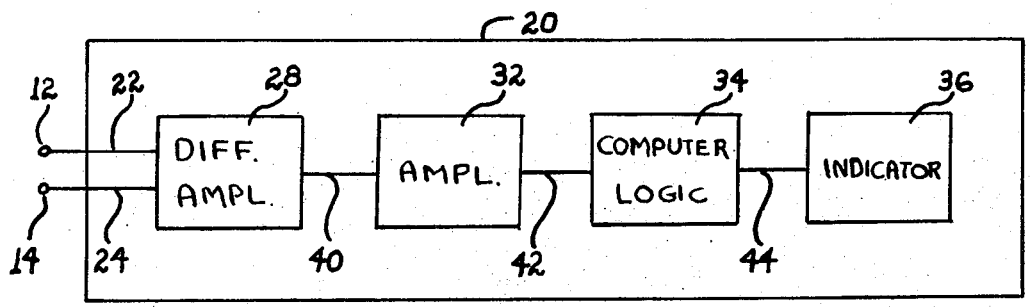
FIG. 1 is a block diagram of the major components of the monitor.

Referring to FIG. 1, a schematic representation is shown of the electronic components of the monitor of the invention as attached to an individual or patient (not shown). A pair of transducing electrodes or sensors 12, 14 of known construction are placed in contact with the patient at two of the conventional points at which information for electrocardiographic examinations may be taken. Since these several recognized points on the body generate potentials of different parameters, this information is convertible by the electrodes into electrical signals, which when combined represent a heartbeat waveform. Several of the selected pairs of body points may be represented by the sum of other selected pairs. Thus, any one of the normally used pairs may be selected although a preferred pair of points would provide a positive potential difference. In most individuals, such a preferred point pair would be the right arm and left leg, which pair will be used for the example in the present description.

Figure 4A:
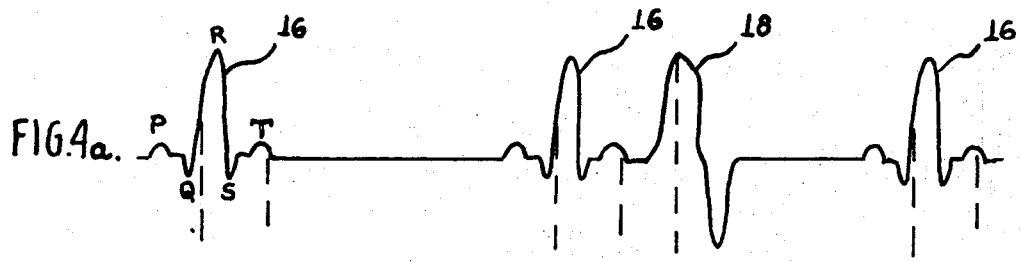
FIGS. 4a–4g are representations of various waveforms useful in explaining the operation of the circuits of FIGS. 1 – 3.

As seen in FIG. 4a, the heart beat waveform comprises a series of R-wave complexes having P, Q, R, S, and T portions, according to conventional designations. Further, a waveform may display abnormalities of the heart in a form such as an extrasystole 18 which appears normally between a pair of R-wave complexes. The representation is shown with a pair of normal R-wave complexes 16 followed by an extrasystole 18 and another R-wave complex 16.

Electrodes 12, 14 are attached to the individual and are connected to the heart beat waveform monitoring device 20 by leads 22, 24, respectively. The heart beat waveform signals are fed to a known electrocardiographic type differential amplifier 28 which combines the signals into the series of R-wave complex waveforms. A high gain amplifier 32 receives and amplifies the R-wave complex and any signals between a first and a succeeding R-wave complex. The amplified waveform is fed to a computer logic circuit 34 which looks for the presence of abnormal waveform portions between a pair of R-wave complex waveforms, and upon detection of such a waveform portion actuates an indicator or alarm mechanism 36.

From sensing electrodes 12, 14, the waveform signal is fed to differential amplifier 28 which raises the level of the signal to a usable level which the succeeding circuitry of the device can process. The signal from differential amplifier 28 is fed along lead 40 as an input signal to the primary amplifier 32. This amplifier further amplifies the signal to a level acceptable by computer circuitry 34, and feeds the signal along lead 42 to that circuitry. An output or activating signal from computer circuitry 34 is fed along another lead 44 to indicator 36. The above differential amplifier, the primary amplifier, and any necessary intermediate buffer stages (not shown) are well known to those skilled in the art and, thus, will not be described in greater detail.

Figure 2:
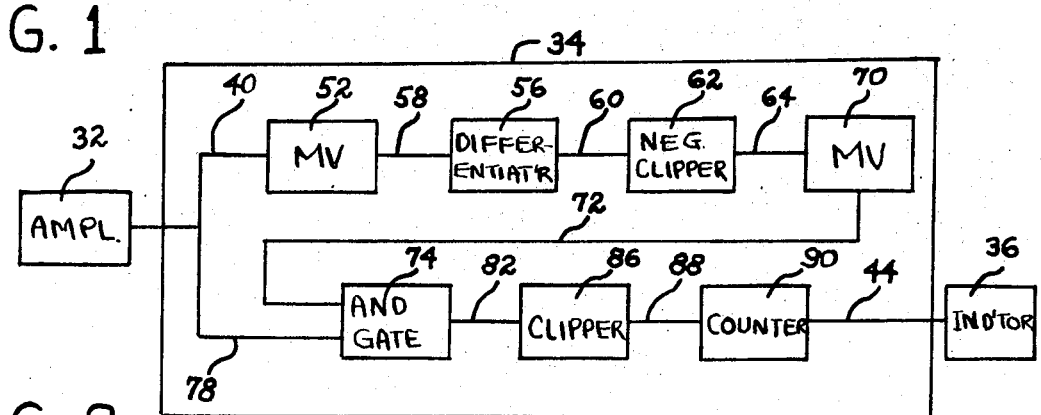
FIG. 2 is a block diagram of the computer logic circuit of the monitor of FIG. 1.
Figure 4B:
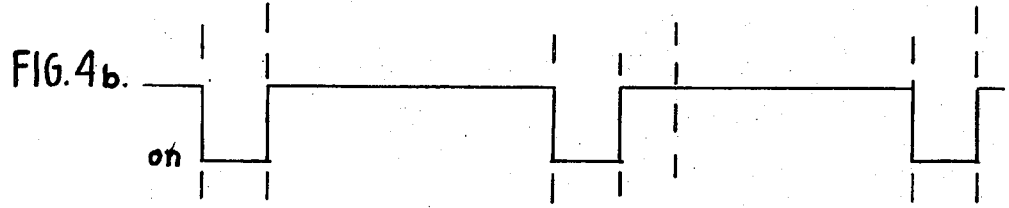

The novel computer logic circuitry shown generally at 34 is shown more particularly in FIG. 2. A monostable multivibrator 52 receives the signal representative of the heart beat waveform and triggers a blanking pulse preventing passage of other signals during the blanking period. The multivibrator is adjusted such that each QR rise of the R-wave complex initiates an "on" signal of the multivibrator. Multivibrator 52 is selected with values to cause triggering only when a predetermined value is exceeded and to prevent being triggered by other segments of an R-wave complex, such as P and T waves, respectively. As represented in FIG. 4b, the "on" or blanking time of operation of multivibrator 52 is selected for predetermined periods adequate to prevent passage of the R, S, and T portions of the R-wave complex.

Figure 4C:
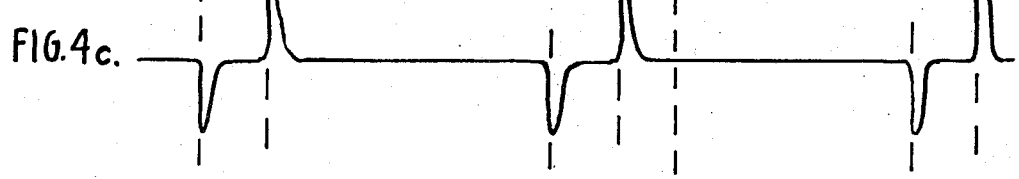
Figure 4D:
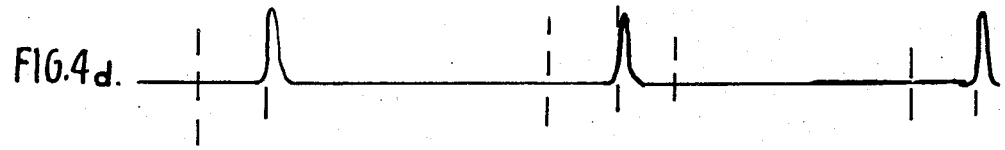

A differentiator or resistance capacitance network 56 is connected by lead 58 to multivibrator 52 to respond to the "on" and "off" states of the multivibrator, and to differentiate these pulse signals shown in FIG. 4c. The resulting differentiated signal is passed along lead 60 to a negative clipper 62 which passes only positive pulse signals (FIG. 4d) along lead 64. The clipper presents a low impedance path to ground for all negative signals received, but passes the positive pulses to a second monostable multivibrator 70.

Figure 4E:
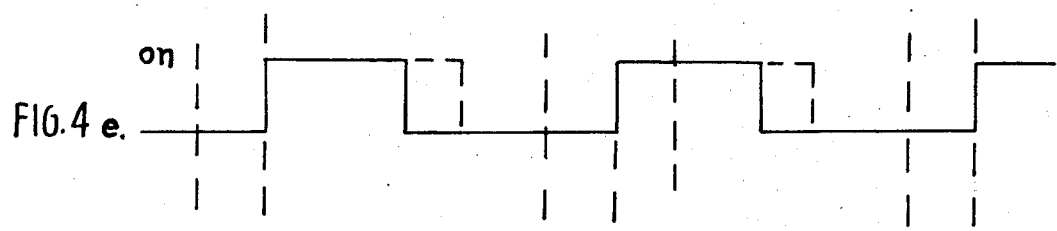
Figure 4F:
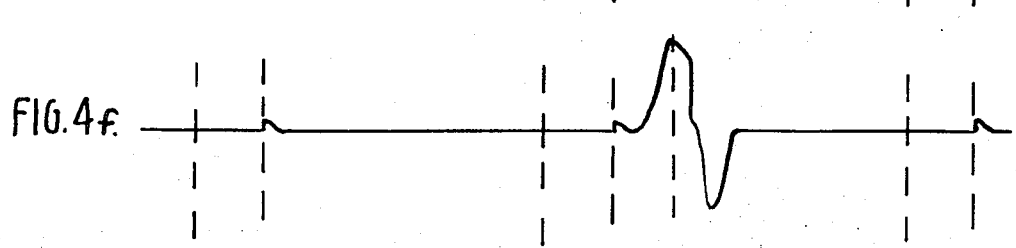
Figure 4G:
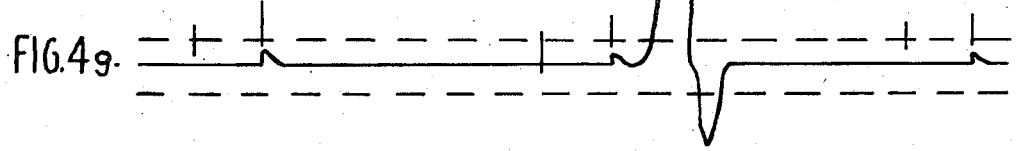

Second multivibrator 70 is of construction similar to first multivibrator 52, and as shown in FIG. 4e, is adjustable to varying lengths of "on" times following a trigger pulse. The multivibrator receives any positive pulse passed by clipper 62, and turns "on" for a pre-adjusted period. During the "on" time, the received pulse is fed along lead 72 to an AND gate 74 to open same wherein any heart beat waveform occurring during the "on" time of multivibrator 70 and passed along lead 78 from amplifier 32 may pass through the gate. No signal is received at AND gate 74 from an R-wave complex since the gate is blocked by multivibrator 52. However, should an extrasystole appear while AND gate 74 is in an "on" state, a pulse representative of the extrasystole will pass through the gate.

By a lead 82, a pulse representative of an extrasystole is passed to a clipper 86 which is adjusted to exclude passing therefrom small amplitude pulses due to extraneous signals or noise which might appear on lead 82.

Each pulse, passed by clipper 86 on lead 88, reaches pre-set counter 90 which receives and stores that pulse for a predetermined time. The counter is selected and adjusted to accumulate a predetermined number of pulses in a given time period before passing an indicator activating pulse. Should the counter receive in the time period less than the number of pulses required to trigger same, an automatic reset circuit takes over to cause the counter to receive another sequence of pulses without triggering. However, assuming that counter 90 is set to trigger upon receiving one pulse, the trigger signal is passed along lead 44 to activate alarm or indicator circuit 36. The alarm circuit may energize any of several warning devices perceptible to a human sense. Hence, the individual or patient is alerted only when an abnormality such as an extrasystole suggestive of an impending heart condition occurs.

As above described, second multivibrator 70 is adjustable to maintain AND gate 74 open for differing periods of time, preferably approximately half the period between consecutive R-wave complexes is selected. Assuming an extrasystole appears in the first half period after a triggering R-wave complex, indicator 36 will be activated as above described. However, if the extrasystole appears in the second half period, first multivibrator 52 and second multivibrator 70 will receive the representative signal as a synthetic R-wave complex. That is, since in the second half period, multivibrator 52 and AND gate 80 are "off" awaiting another trigger level pulse. Thus, the circuits are available to be triggered by a pulse analogous to a QR rise of an R-wave complex. Therefore, when such a pulse triggers the circuitry, AND gate 74 is turned "on" to receive the next R-wave complex which will cause counter 90 to respond as though a true extrasystole had been received.

Figure 3:
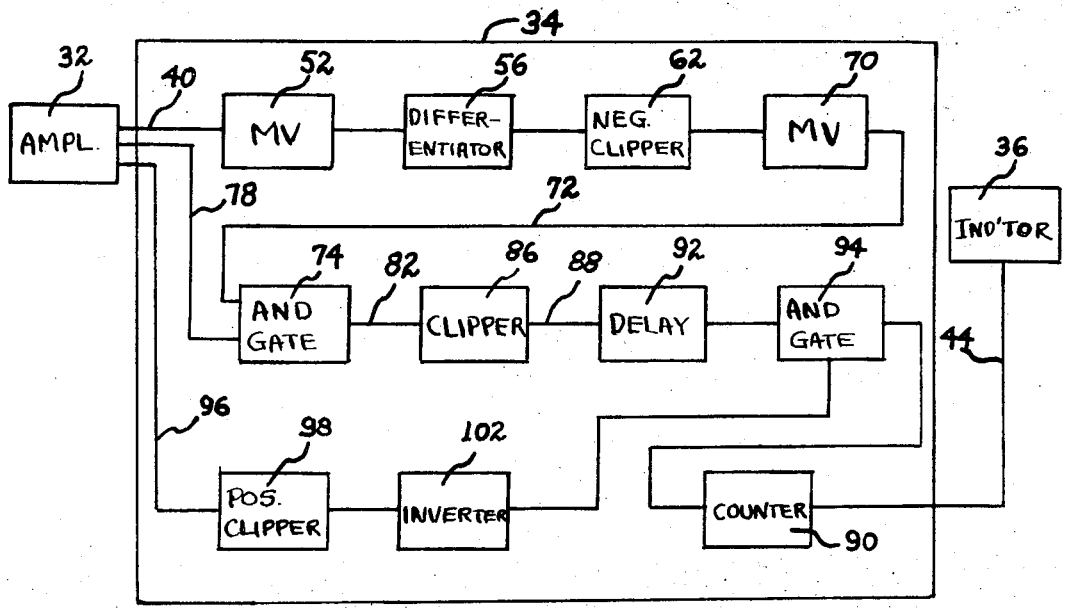
FIG. 3 is a block diagram of another embodiment of the computer logic circuit of the monitor of FIG. 1.

Referring to the modified embodiment of computer logic circuitry shown in FIG. 3, the heart beat waveform is monitored to detect an extrasystole by comparing presence of positive and negative overshoots of the extrasystole generated signals. As seen in FIG. 4a, the extrasystole has a definite negative overshoot not present in an R-wave complex of a normal waveform. Thus, by this embodiment, if an extrasystole is not in the waveform, indicator 36 would not be activated.

As above described, a series of heart beat waveform signals is received by amplifier 32 and amplified for use by other circuitry. By the described functions of first multivibrator 52, differentiator 56, negative clipper 62, and second multivibrator 70, a waveform other than an R-wave complex is passed simultaneously on leads 72 and 78 and through AND gate 74.

Upon appearance of a pulse on lead 82 from AND gate 74, negative clipper 86 removes the negative overshoot portion of the extrasystole and passes along an output lead 88 only the positive portion of the waveform. A signal stretcher or delay 92 receives the pulse from lead 88 and modifies the time phase of that pulse before passing same to turn "on" a second AND gate 94. As the amplifier passes signals along leads 72, 78, an unprocessed signal is fed along another lead 96 to a positive clipper 98 which will pass only a negative signal such as the trailing portion of an extrasystole. A signal inverter 102 receives the signal and changes its polarity to feed to AND gate 94 a signal of the same polarity as the signal from AND gate 74. Since AND gate 94 is "on" at a time different from the negative signal, delay 92 is necessary to bring the positive and inverted negative signal portions into time coincidence so as to simultaneously feed both pulses to AND gate 94. When both pulses are received by AND gate 94, an output signal is passed to counter 90 to activate indicator 36 in the manner as above described.

The invention in its broader aspects is not to be limited to the specific details shown and described, but may extend in details within the scope of the disclosure without departing from the scope of the invention.

I claim as my invention:

1. Heart beat waveform monitoring apparatus for detecting by transducers secured to a patient heart beat waveforms and for detecting heartbeat waveforms occuring intermediate a pair of normal R-wave complexes of an electrocardiagraphic heart beat waveform occuring during a predetermined period comprising:

first means sensing presence of a QR rise in a heart beat waveform and triggering at a predetermined level of said rise to generate a blanking pulse having a duration greater than a normal R-wave complex;

second means producing a pulse of pre-set duration upon completion of said blanking pulse from said first means;

an AND gate controlled to an "on" state by said pulse of said second means to pass waveforms while in said "on" state;

third means accumulating waveform pulses occurring while said AND gate is periodically in said "on" state; and indicator means connected to be activated upon receiving a pulse from said third means when said third means accumulates a predetermined number of waveform pulses in a predetermined period.

2. Apparatus as in claim 1 wherein said first sensing means is a multivibrator.

3. Apparatus as in claim 1 wherein said second means is a multi-vibrator.

4. Apparatus as in claim 1 wherein said third means is a counter.

5. Apparatus as in claim 1 wherein said third means includes a second AND gate to receive a waveform simultaneously with said AND gate.

6. Apparatus as in claim 1 wherein said third means is a pulse counter responsive to positive pulses passed by said AND gate.

7. Apparatus as in claim 6 including an input amplifier connected to said first means, said first AND gate, and said second AND gate to receive waveforms.

8. Apparatus as in claim 1 including an input amplifier connected to said first means and said AND gate to receive waveforms, said AND gate passing a waveform when in an "on" state.

* * * * *